Patented May 2, 1950

2,506,486

UNITED STATES PATENT OFFICE 2,506,486

THERMOSETTING RESIN FROM A DIPHENOL AND A DIGLYCIDYL ETHER OF A DIPHENOL

Howard L. Bender and Alford G. Farnham, Bloomfield, and J. Walter Guyer, Verona, N. J., assignors, by mesne assignments, to Union Carbide and Carbon Corporation, a corporation of New York No Drawing. Application April 21, 1948,
Serial No. 22,506

27 Claims. (Cl. 260—47)

1

This invention relates to thermosetting compositions and to thermoset resins made therefrom. It is more particularly concerned with improved thermosetting compositions and thermoset resins made from a diphenol and a diglycidyl ether of a diphenol, as for instance, diphenylolmethane, $CH_2(C_6H_4OH)_2$ and the diglycidyl ether of diphenylolpropane. The invention also includes methods of making our new and improved compositions and resins.

It is known that epoxy compounds undergo self-polymerization and condensation and the preparation of solid condensation products by heating the reaction product of epichlorhydrin and resorcinol or of epichlorhydrin and diphenylolpropane has been suggested in U. S. Patent 2,324,483 and British Patent 579,698.

The present invention is based on our discovery that new and improved thermosetting compositions are produced on mixing or blending a diphenol with a diglycidyl ether of a diphenol in a ratio of about 0.2 to 1.0 mol of the diphenol per mol of the diglycidyl ether. The resulting thermosetting composition is hardenable into a thermoset resin which does not flow by gravity at elevated temperatures, even if the heating is carried to the point of charring. Our thermosetting composition may be hardened under applied pressure to form molded objects, or it may be hardened in the form of cast shapes or films. The hardening takes place without discoloration or darkening of the material and when pure materials are used, the hardened composition is clear and colorless. The thermoset resin has high tensile strength, and is resistant to alkalies and other bases. It undergoes no change in color or weight in contact with hot aqueous sodium hydroxide (10 per cent concentration at a temperature of about 60° C.) for a period as long as an hour.

Unlike thermoset phenol-formaldehyde resins the thermoset resin of the present invention is horny and tough. It is more resistant to shock, even in the unplasticized state, than plasticized thermoset phenol-formaldehyde resins, and it may be cut, turned, sawed, machined and the like, without fracturing, cracking or chipping. In the form of cast bodies or films, the thermoset resin may have a tensile strength of about 6000 to 12,000 p. s. i., and a flexural strength of about 6000 to 20,000 p. s. i. and higher. It also extends and takes bends better than does a thermoset phenol-formaldehyde resin, when its films are bent, as in wrapping resin-coated metal around objects. Its light resistance is better than that of the best

2 commercially available light-resistant phenol-formaldehyde resins.

Diphenols suitable for blending or mixing with glycidyl ethers in making the thermosetting composition of the present invention may be represented by the general formula

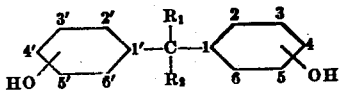

in which the phenolic hydroxyl groups may be in the 2,2'; 2,3'; 2,4'; 2,5'; 2,6'; 3,3'; 3,4'; 3,5'; 3,6'; 4,4'; 4,5'; 4,6'; 5,5'; 5,6' and 6,6' positions on the aromatic rings, and in which $R_1$ and $R_2$, separately, may be hydrogen, methyl, ethyl, propyl, isopropyl, butyl, isobutyl, pentyl, isopentyl, hexyl, isohexyl, a cyclohexyl, including the methyl, ethyl, propyl, butyl, pentyl and hexyl substituted cyclohexyls, a phenyl, including the methyl, ethyl, propyl, butyl, pentyl and hexyl substituted phenyl; and in which $R_1$ and $R_2$ taken together may be a cyclohexyl or a phenyl group, including the methyl, ethyl, propyl, butyl, isobutyl, pentyl, hexyl, substituted cyclohexyls or substituted phenyls, such that the total number of carbon atoms in $R_1$ and $R_2$ does not exceed twelve. As will be apparent from theoretical considerations, positions 2 and 6 may be considered equivalent, with other equivalent positions being 2' and 6'; 3 and 5; and 3' and 5'. When $R_1$ and $R_2$, separately, or $R_1$ and $R_2$, collectively, are phenyl, the aromatic rings may contain fluorine and chlorine substituents, as in the fluorophenyls, including the monofluorophenyls, the difluorophenyls, the trifluorophenyls, the chlorophenyls, the dichlorophenyls, the trichlorophenyls, and the fluorochlorophenyls.

These diphenols include, by way of further illustration, the 2,2'; 2,3'; 2,4'; 3,3'; 3,4' and 4,4' isomers of dihydroxydiphenyl methane, $$CH_2(C_6H_4OH)_2$$

of dihydroxydiphenylmethylmethane, $$CH_3CH(C_6H_4OH)_2$$

of dihydroxydiphenyldimethylmethane, $$(CH_3)_2C(C_6H_4OH)_2$$

of dihydroxydiphenylethylmethylmethane, $$C_2H_5C(CH_3)(C_6H_4OH)_2$$

of dihydroxydiphenyldiethylmethane, $$(C_2H_5)_2C(C_6H_4OH)_2$$

of dihydroxydiphenylmethylpropylmethane, $$CH_3C(C_3H_7)(C_6H_4OH)_2$$

of higher homologs up to and including the mono- and dihexyl and mono- and dicyclohexyldiphenylolmethanes, of dihydroxydiphenylmethylphenylmethane, $$CH_3C(C_6H_5)(C_6H_4OH)_2$$

of dihydroxydiphenylethylphenylmethane, $$C_2H_5C(C_6H_5)(C_6H_4OH)_2$$

of dihydroxydiphenylpropylphenylmethane, $$C_3H_7C(C_6H_5)(C_6H_4OH)_2$$

of dihydroxydiphenylbutylphenylmethane, $$C_4H_9C(C_6H_5)(C_6H_4OH)_2$$

of dihydroxydiphenyltolylmethane, $$(CH_3C_6H_4)CH(C_6H_4OH)_2$$

of dihydroxydiphenyltolylmethylmethane, $$(CH_3C_6H_4)C(CH_3)(C_6H_4OH)_2$$

and higher homologs thereof up to and including a total of twelve carbon atoms in the groups ($R_1$ and $R_2$) attached to the methane or connector carbon atom to which the two phenylol groups are attached; and of diphenylolcyclohexane, $$C_6H_{10}(C_6H_4OH)_2$$

and homologs thereof. Substituent groups may also be present on the aromatic ring of one or both of the phenylol groups of the foregoing diphenols. The 4,4'-dihydroxydiphenyl isomers, for instance, can have the 2, 3, 5, 6, 2', 3', 5' and 6' positions available for substituents. The positions available for substituents in other isomers will readily be apparent in accord with well-established principles. These substituents may be the lower alkyl groups as methyl, ethyl, propyl, butyl, pentyl, and hexyl and the halogens, fluorine and chlorine.

By terms "diphenol," "diphenylol," "bisphenol," and "dihydroxydiphenyl" as used herein is meant the dihydroxydiphenylmethanes, including the isomers, homologs and substituted dihydroxydiphenylmethane compounds all as set forth above. Unless the positions of the phenolic hydroxyl groups are otherwise specifically indicated, it is to be understood that they are in the 4,4'(para, para') positions on the phenylol rings.

The 4,4'-diphenols may often conveniently be made by the condensation of non-para-substituted phenol, or phenols, with an aldehyde or ketone in the ratio of two mols of phenol per mol of the carbonyl compound. By way of illustration, to obtain diphenylolpropane, a mixture of 188 parts of phenol, 58.1 parts of acetone and 50 parts of concentrated hydrochloric acid are allowed to stand at ambient room temperatures for a period of about a week. The reaction mixture is then neutralized in benzene solution, the solvent removed as by distillation and the residue filtered to remove precipitated salt. Upon distillation of the residue at a reduced pressure of about one millimeter of mercury, for instance, 4,4'-dihydroxydiphenyldimethylmethane is obtained in good yield. Instead of phenol there may be used ortho, meta or para cresols, or ortho, meta or para halogenated phenols in which the halogen is fluorine or chlorine, to form the corresponding ring-substituted diphenylolpropanes.

Diphenylol derivatives of other aldehydes or ketones may also be used as of cyclohexanone, acetophenone, acetaldehyde, hexaldehyde, benzophenone, benzaldehyde, and the like, containing not more than seven carbon atoms to the molecule in the case of the saturated aliphatic aldehydes, and not more than thirteen carbon atoms to the molecule in the case of aromatic aldehydes and aliphatic and aromatic ketones.

Diglycidyl ethers suitable for blending or mixing with any of the foregoing diphenols in making our new and improved thermosetting compositions may be represented by the general formula

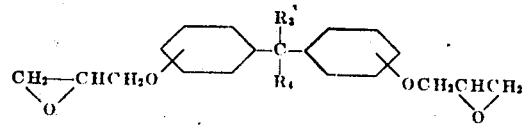

in which the epoxypropoxy groups may be in the 2,2', 2,3', 2,4', 3,3', 3,4' and 4,4' positions on the aromatic rings and in which $R_3$ and $R_4$, separately or collectively, may be as defined above with respect to $R_1$ and $R_2$ of the diphenols. Restated in other words, diglycidyl ethers suitable for interaction with a diphenol in making our new and improved compositions are the diglycidyl ethers of any of the foregoing diphenols, including by way of further illustration, the 2,2', 2,3', 2,4', 3,3', 3,4' and 4,4' isomers of di(epoxypropoxyphenyl) methane $$CH_2(C_6H_4OCH_2CHCH_2)_2$$
$$\diagdown O \diagup$$

of di(epoxypropoxyphenyl) methylmethane $$CH_3CH(C_6H_4OCH_2CH\text{---}CH_2)_2$$
$$\diagdown O \diagup$$

of di(epoxypropoxyphenyl) dimethylmethane $$(CH_3)_2C(C_6H_4OCH_2CH\text{---}CH_2)_2$$
$$\diagdown O \diagup$$

and of higher homologs thereof up to and including the di(epoxypropoxyphenyl) mono- and dihexyl, and mono- and dicyclohexylmethanes; of di(epoxypropoxyphenyl) phenylmethane $$C_6H_5CH(C_6H_4OCH_2CHCH_2)_2$$
$$\diagdown O \diagup$$

of di(epoxypropoxyphenyl) phenylmethylmethane $$CH_3C(C_6H_5)(C_6H_4OCH_2CH\text{---}CH_2)_2$$
$$\diagdown O \diagup$$

and of higher homologs thereof up to and including a total of twelve carbon atoms in the groups ($R_3$ and $R_4$) attached to the methane or connector carbon atom to which the two epoxypropoxyphenyl groups are attached; and of di(epoxypropoxyphenyl) cyclohexane $$C_6H_{10}(C_6H_4OCH_2CH\text{---}CH_2)_2$$
$$\diagdown O \diagup$$

and homologs thereof. Substituent groups may also be present on the aromatic ring of one or both of the epoxypropoxyphenyl groups of the foregoing diglycidyl ethers, the 4,4' di(epoxypropoxyphenyl) isomers having the 2, 3, 5, 6, 2', 3', 5' and 6' available for substituents. The positions available for substituents in other isomers will readily be apparent in accord with well-established principles. These substituents may be the lower alkyl groups, methyl, ethyl, propyl, butyl, pentyl, hexyl and the halogens fluorine and chlorine.

By the term "diglycidylether" or "diepoxypropoxyether" as used herein is meant the di(epoxypropoxyphenyl) methanes, wherein two epoxypropoxyphenyl groups are joined by a single connector carbon atom, or methane carbon atom, including isomers and homologs thereof, which are the diglycidyl ethers of alkyl or aryl substituted diphenylolmethanes, all as set forth above. Unless the positions of the epoxypropoxy groups are otherwise specifically designated or indicated, it is to be understood that they are in the 4,4'(para, para') positions on the aromatic ring.

The diglycidyl ethers useful in making our new and improved thermosetting compositions and thermoset resins may be made by reacting epichlorhydrin with a diphenol, for instance any of the diphenols set forth above, in the ratio of two mols of epichlorhydrin per mol of diphenol. It is generally convenient, but not necessary, to carry out the reaction using more than two mols of the epichlorhydrin per mol of diphenol. Sodium hydroxide, or other alkali or basic oxide in an amount which is at least sufficient to bind, as chloride, the chlorine present in the reacted chlorhydrin, is used to complete the reaction. By way of illustration, 228 parts (1 mol) of 4,4'dihydroxydiphenyldimethylmethane (diphenylolpropane) is dissolved in a mixture containing 800 parts of water, 80 parts (2 mols) of sodium hydroxide and 400 parts of ethanol, and the resulting solution added to a mixture of 400 parts (4.31 mols) of epichlorhydrin in 400 parts of ethanol, at a temperature of 50° C. Preferably the diphenol is added to the epichlorhydrin in such fashion that the epichlorhydrin is maintained in excess during the reaction. The reaction mixture is then heated at a temperature of 80° C. for a period of about an hour. Excess epichlorhydrin and alcohol solvent is removed from the reaction mixture, as by distillation, and the residue thus obtained may be dissolved in benzene and washed successively with caustic solution and water to remove the chloride salt and other water-soluble impurities. The diglycidyl ether of 4,4'dihydroxydiphenyldimethylmethane which remains as a somewhat impure residue product upon removal of the benzene, may be purified by distillation, if desired, collecting it as a fraction boiling at 230° C. to 270° C., at a reduced pressure of 0.5 to 0.7 millimeter of mercury, or at 150° in a molecular still at 10 microns pressure. Instead of epichlorhydrin, either of the two glycol dichlorhydrins, 1,2 or 1,3 may be used, together with the larger amount of base required to bind the chlorine, as chloride.

The thermosetting compositions of our invention may be made by mixing the diphenol and the diglycidyl ether to form a homogeneous blend. With viscous or solid reactants, the blending to a homogeneous state is assisted by gentle heating, as for instance up to a temperature of about 80° C., or by the use of solvents, or both. Removal of solvents used in blending may be effected by known expedients as by evaporation or distillation, prior to hardening of the thermosetting compositions to the infusible, insoluble resin masses. Catalyst may also be present in the composition, being added either at the time of blending or introduced subsequently.

The homogeneous mixtures or blends, thus obtained, react but slowly in the absence of heating or of catalyst, and when one or both of the reactants are normally crystalline, the blend may exhibit crystallization on cooling or chilling to room temperature or below. However, mixtures which have been aged or reacted to the extent of ten per cent or more of the initial epoxy content but which are still not thermoset do not crystallize on chilling but instead, form solid fusible resinous masses which exhibit conchoidal fractures when shattered by a blow. Before attaining the thermoset or solid infusible condition, the blend or composition passes through a series of fusible resin states of progressively increasing viscosity and progressively higher fusion or softening temperatures, as the proportion of reacted epoxy groups increases above about ten per cent of the initial epoxy concentration. In these intermediate liquid or fusible resin stages, the thermosetting composition is soluble in such solvents as ketones, ethanol, benzene, toluene, and chlorinated hydrocarbons, the solubility decreasing progressively as the thermoset condition is approached. The resin in the solid gel or thermoset state is insoluble in such solvents, with the resistance to attack by these solvents increasing with continued heating of the thermoset resin, as hereinafter described.

Hardening of our diphenol-diglycidylether thermosetting composition to an infusible solid state or gel may be accomplished by bringing it to a reaction temperature so chosen as to afford a suitable reaction period or rate. In the absence of catalyst the conversion to the thermoset resin will take place on heating, but at a slower speed than when catalyst is used. The smaller the amount of catalyst, or the lower the temperature, the longer the time required to convert the composition to the solid, infusible state.

Preferably, the hardening is carried out at a temperature of 90 to 175° C., in the presence of a small amount of catalyst, for instance about one per cent of the weight of the reactants in the case of alkali metal hydroxide catalyst. Within this temperature range, the hardening rate may be varied over a period of from one minute to seven hours, approximately, depending upon the particular catalyst and the amount employed. Although the hardening periods or rates of hardening thus available over this preferred temperature range will be found adequate for most purposes, hardening also takes place at temperatures below 90° C., but at a considerably slower rate which may be found advantageous where slow hardening is desired.

The resistance of the thermoset resin in the form of molded or cast shapes and films to attack by solvents increases with heating continued after the composition has been converted to the solid, infusible state or gel. Such prolonged or continued heating is accordingly advocated where resistance to active solvents in which the thermosetting compositions are soluble, as for instance ketones or chlorinated hydrocarbons is a factor in the use to which the resin is to be put. Heating at a temperature of 100° C. or above, is usually sufficient to provide such increased resistance to attack by solvents, and is preferred.

Catalysts suitable for use in converting our diphenyl-diglycidyl ether reactive compositions to the thermoset resin include alkalies and alkaline reacting substances, acids, salts including alkaline reacting salts, basic nitrogen compounds, metallic surfaces and the like, as may be illustrated, for instance, by the hydroxides of lithium, sodium, or potassium, calcium oxide, ammonia, dimethylamine, trimethylamine, triethylamine, 1,3-propanediamine, dimethylaminomethyl phenol, hexamethylenetetramine, and other mono-, di-, and triamines, quaternary ammonium compounds, sodium acetate, boron trifluoride, phosphoric acid, copper and a variety of others. Based on the weight of the reactants, as little as 0.25 per cent of potassium hydroxide, or an equivalent amount of dimethylaminomethyl phenol, 0.675 per cent; or of triethylamine, 0.45 per cent; or of trimethylamine, 0.26 per cent is effective for accelerating the reaction, but about one per cent of the alkali metal hydroxide, or its equivalent is preferred.

Diphenol-diglycidyl ether blends or compositions made from more than one mol of diphenol per mol of diglycidyl ether, upon reaction in the presence of catalyst, or by heating, or both, yield solid, brittle resins which are permanently fusible and which flow by gravity on heating. However, upon blending or mixing such a permanently fusible resin with additional diglycidyl ether so that diphenol is present or combined therein in the ratio of not more than one mol per mol of diglycidyl ether, the composition becomes thermosetting and may be hardened to the infusible, solid state or gel. All such blends or compositions in which the diphenol is present or combined therein in a ratio of from 0.2 to 1.0 mol per mol of diglycidyl ether, however made, are within the scope of the present invention and it is our intention to cover such blends and the thermoset resins made therefrom.

In making our new and improved thermosetting compositions the diphenol need not necessarily be the same as the diphenol of the diglycidyl ether. In many instances it will be advantageous to use a diphenol different from that of the diglycidyl ether, in order to obtain desired properties in the thermosetting composition or in the thermoset resin made therefrom. Cost of raw materials may also be a determining factor in the choice of reactants. For instance, diphenylolmethane may be blended with the diglycidyl ether of a dihydroxydiphenyldimethylmethane (a diphenylolpropane); or 4,4'dihydroxydiphenyldicyclohexylmethane with the diglycidylether of 4,4'dihydroxydiphenyldihexylmethane.

Thermosetting compositions made from 0.4 to 0.95 mol of diphenol per mol of a diglycidyl ether, and the thermoset resins made therefrom, are preferred.

The invention may be further illustrated by the examples which follow.

*Example 1*

To 336 parts of a residue product (obtained by reacting 185 parts (2 mols) of epichlorhydrin with 228 parts (1 mol) of 4,4'dihydroxydiphenyldimethylmethane, using the equivalent amount of sodium hydroxide (2 mols) to bind, as chloride, the chlorine present in the reaction) were added 114 parts (0.5 mol) of 4,4'dihydroxydiphenyldimethylmethane. On warming at 60° C. there resulted a viscous, homogeneous composition which remained clear on cooling to room temperature. A part of this blend to which had been added one per cent of solid potassium hydroxide as catalyst, based on the weight of the mixture was poured into open-top casting molds and heated at a temperature of about 90° C. for a period of about four hours. The resulting gel was then heated at a temperature of 135° C. for a period of about twelve hours.

The residue product used in making the resin was a viscous liquid (5000 centipoises at 25° C.) containing epoxy rings corresponding to a content of 90.6 per cent of the diglycidyl ether of 4,4'dihydroxydiphenyldimethylmethane. This amount of diphenol was equivalent to a ratio of 0.559 mol of the diphenol per mol of the diglycidyl ether in the blend. The residue product also contained resinous material, present in the heat-hardened product to about 7 per cent by calculated weight, which was considered to serve as a resinous plasticizer.

The cast thermoset resins thus obtained in mass form were infusible and insoluble in acetone, phenol, benzene water, alcohol and such other common solvents, as gasoline, toluene, or diethyl ether. The cast resins were tougher and stronger than cast phenolic resins of the type made from one to three mols of formaldehyde per mol of phenol. They were also unaffected by dilute or concentrated aqueous sodium hydroxide solutions (10 to 50 per cent), or by dilute or concentrated hydrochloric acid, at temperatures up to 60° C.

The strengths of the above cast resin were determined to be as follows:

| | |
|---|---|
| Izod impact (ft. lbs. per inch of notch) | 1.566 |
| Flexural (lbs. per sq. inch) | 18,100 |
| Modulus of elasticity (lbs. per sq. inch) | $4.04 \times 10^5$ |
| Rockwell hardness (M scale) | 79 |
| Tensile strength (lbs. per sq. inch) | 12,000 |

Another part of the blend of the diphenol and the diglycidyl ether, containing catalyst, was dissolved in ethanol in the form of a solution of 50 per cent concentration, by weight. The alcohol solution was then applied to paper in sufficient amounts to make a resin-paper composite with 50 per cent resin content. The composite was dried and partially heat-advanced by heating it at a temperature of 135° C. until a volatile content of about 0.6 per cent was obtained, as determined by heating a sample to constant weight at 135° C. The dried, heat-advanced composite was then pressed between mold platens at a temperature of 140 to 150° C. and at a pressure of about 1000 p. s. i., gage, for a period of about 40 minutes to bind the sheets and thermoset the resin. The hardened, pressed sheet on testing for water absorption increased in weight about 1.9 per cent on immersion for a period of 24 hours at room temperature. On immersion in aqueous sodium hydroxide solution of 10 per cent concentration for a period of 24 hours at room temperature, the gain in weight was 1.7 per cent. The sheet had a flexual strength of 19,900 pounds per square inch and an impact strength, Izod impact test, of 0.86 foot pound per inch of notch.

*Example 2*

(a) One hundred eighty-five parts (0.81 mol) of 4,4'dihydroxydiphenyldimethylmethane was added to 416 parts of a residue product containing epoxy rings corresponding to a content of 81.76 per cent of the diglycidyl ether of 4,4'dihydroxydiphenyldimethylmethane, such amounts corresponding to a ratio of 0.81 mol of the diphenol reagent per mol of the diglycidyl ether of the diphenol. This blend was more viscous than that of Example 1, and a slightly longer warming and mixing period was required to obtain a clear solution at 60° C. One and two-tenths per cent of solid potassium hydroxide, based on the weight of the mixture, was added as catalyst. This composition having a plasticizer content of 12.6 per cent from the residue product, gelled in 5 minutes when placed on a hot plate maintained at a temperature of 160° C.

Thermoset castings which were very light straw-colored were made by melting and pouring another portion of composition into molds, heating it in an oven at a temperature of 90° C. to obtain an infusible gel, and then further hardening the gelled resin for a total period of 24 hours at about 90° C. The tensile strength of duplicate castings was measured and found to be 11,100 and 11,040 p. s. i.

(b) For purposes of comparison with a product lacking in added diphenol, 1.2 per cent, by weight, of potassium hydroxide was added to another portion of the same diglycidyl ether residue product having an epoxy content corresponding to 81.76 per cent of diglycidyl ether. At a hot plate test temperature of 160° C. the mixture gelled in three minutes. The remainder of the catalyst-containing diglycidyl ether was then hardened in the form of castings by heating at a temperature of 90° C. for a period of 24 hours. The castings were brittle, dark in color and a number of them cracked on cooling. The tensile strength of those castings which did not crack on cooling were found to be about 1000 p. s. i., which is very low in comparison with the castings of part (a) of this example.

In preparing the residue product used in making the thermoset resins of this example, 670 parts of epichlorhydrin were dissolved in 900 parts of ethanol and to this solution were added 417.5 parts of 4,4'dihydroxydiphenyldimethylmethane dissolved in 1370 parts of water containing 146 parts of sodium hydroxide. The addition was carried out at a temperature of 50° to 55°C., and after adding 6 parts of sodium hydroxide in 30 parts of water, the reaction mixture was then heated at a temperature of 60° to 65° C. for a period of about 30 minutes. Thereupon the excess epichlorhydrin was removed by distillation. The residue product was then dissolved in benzene, washed with water, and the benzene removed by distillation to yield 624 parts of residue product.

*Example 3*

To illustrate the effect of the ratio of the 4,4'dihydroxydiphenyldimethylmethane to the diglycidyl ether 4,4'dihydroxydiphenyldimethylmethane upon the hardening characteristics of the thermosetting compositions mixture, a number of blends were prepared employing various ratios of diphenol per mol of the diglycidyl ether residue product. Eighty-five parts of the diglycidyl ether residue product together with one per cent (0.85 part) of potassium hydroxide catalyst were dissolved in about 140 parts of a solvent consisting of equal volumes of ethanol, acetone and toluene. To portions of this solution were added differing amounts of the diphenol, and the solution refluxed for a period of two hours at a temperature of about 60° C. At the end of this time the solutions were poured on to a hot plate, maintained at a temperature of 160° C., and the elapsed time noted between the pouring and the formation of an infusible resin film. The results are shown in the following table:

| Ratio of Diphenol to Diglycidyl Ether, Mol/mol | Time Required for the Mixture to Gel at 160° C. |
|---|---|
| 1.1 to 1 | Did not gel. Thin liquid after 20 minutes. |
| 1.05 to 1 | Became stiff liquid. Did not gel in 20 minutes. |
| 0.95 to 1 | Hardened within four minutes. |

The diglycidyl ether was prepared by adding 228 parts (1 mol) of 4,4'dihydroxydiphenyldimethylmethane dissolved in a mixture containing 80 parts water, 320 parts ethanol and 80 parts sodium hydroxide to a solution of 400 parts (4.32 mols) of epichlorhydrin in solution in 320 parts of ethanol, in such manner that the epichlorhydrin was always in excess and at a temperature of 50° C. The mixture was then heated at a temperature of 60° C. for a period of one hour and the excess epichlorhydrin removed by distillation. After the product, in benzene solution, had been washed with water, it was fractionally distilled. There was obtained 212 parts of diglycidyl ether boiling at 230° to 250° C. at a pressure of 0.5 to 0.7 millimeter of mercury and having a refractive index ($n_D^{25}$) of 1.591. The product was found to distill smoothly at 150° C. at 10 microns pressure in a molecular still.

The diglycidyl ether, without added 4,4'dihydroxydiphenyldimethylmethane, gelled within 3.5 minutes in the presence of 0.4 per cent of solid sodium hydroxide catalyst with the temperature initially at 100° C. Because of the heat generated by the reaction, the actual temperature of the material was somewhat higher.

*Example 4*

A viscous blend was formed by warming together at a temperature of 60° C., 27.6 parts (0.12 mol) of 4,4'dihydroxydiphenyldimethylmethane, 0.9 part of potassium hydroxide on a contained alkali basis, and 200 parts of the diglycidyl ether of 4,4'dihydroxydiphenyldimethylmethane having an epoxy content which was 86.8 per cent of theory. These amounts are in the ratio of 0.23 mol of diphenol per mol of diglycidyl ether and about 0.4 per cent of potassium hydroxide based on the diphenol-diether mixture.

The blend was warmed to 70° C. to reduce its viscosity, and poured into molds, which were then placed in a hot-air oven and heated at a temperature of 90° C. for a period of twenty-four hours. Thermoset castings were obtained. The tensile strength of the castings averaged about 7455 p. s. i.

*Example 5*

Two hundred parts of the same lot of diglycidyl ether used in Example 4 (epoxy content, 86.8 per cent of theory) was blended by warming to a temperature of 60° C. with 39.9 parts (0.175 mol) of 4,4'dihydroxydiphenyldimethylmethane, and 0.94 part of potassium hydroxide on a contained alkali basis, all by weight. These amounts were in the ratio of 0.343 mol of diphenol per mol of diglycidyl ether, and about 0.4 per cent of potassium hydroxide, based on the weight of the blend. A clear, viscous blend resulted. Thermoset castings were made precisely as in Example 4. The tensile strength of the castings averaged about 8345 p. s. i.

*Example 6*

A clear, viscous blend was made by warming to a temperature of 60° C., 47.6 parts of 4,4'dihydroxydiphenyldimethylmethane and 100 parts of the same lot of diglycidyl ether used in Example 4, corresponding to a ratio of 0.81 mol of diphenol per mol of diether. To this blend was added 0.4 per cent of its weight of potassium hydroxide on a contained alkali basis, and the mixture then warmed, poured into open molds and thermoset as in Example 4. The tensile strength of the resulting castings was about 10,900 to 11,000 p. s. i.

*Example 7*

Using 100 parts of the same lot of diglycidyl ether as was used in Example 5, a clear, viscous blend was made with 65.4 parts (0.29 mol) of 4,4'dihydroxydiphenyldimethylmethane, equivalent to a ratio of 1.12 mols of diphenol per mol of diglycidyl ether. To this blend was added 0.66 part (0.4 per cent) of potassium hydroxide on a contained alkali basis, by weight.

The mixture thickened to a hard resin on heating at 90° C. for a period of 3 hours. Heating was continued for a total time of 24 hours. Castings of the resin melted on heating to 160° C. and did not become infusible on continued heating at this temperature. The castings were soluble in acetone and broke under a tensile stress of about 770 p. s. i.

However, upon blending with an additional 25 parts of the same lot of diether, equivalent to a ratio of 0.9 mol of diphenol per mol of the diether, the resin became thermosetting; and upon heating passed to the thermoset condition.

*Example 8*

Forty parts of a diglycidyl ether of 4,4'dihydroxydiphenyldimethylmethane having an epoxy ring content which was 92 per cent of theory was blended with 15 parts (0.066 mol) of 4,4'dihydroxydiphenyldimethylmethane, equivalent to 0.55 mol of diphenol per mol of the diether, by warming to a temperature of 60° C. To this blend which was a clear, viscous liquid was added 1.7 parts of phosphoric acid on a contained acid basis, by weight, and the mixture heated at a temperature of 90° C. for a period of 24 hours. It hardened to an infusible resin.

*Example 9*

A clear, viscous blend was made on warming at a temperature of 60° C., 45.3 parts (0.2 mol) of 4,4'dihydroxydiphenyldimethylmethane and 100 parts of the diglycidyl ether of 4,4'dihydroxydiphenyldimethylmethane, having an epoxy content which was 83.3 per cent of theoretical, equivalent to a ratio of about 0.8 mol of diphenol per mol of diglycidyl ether. To this blend was added 1.82 parts of triethylamine as catalyst, about 0.95 per cent of the blend, by weight. The mixture was warmed to reduce its viscosity and poured into molds at a temperature of about 70° C. The castings were then hardened at a temperature of 90° C. for a period of twenty-four hours. The product was an infusible resin.

A bar of the infusible resin heated to 100° C. could be easily bent by an applied force or postformed. This bent bar retained its bent shape on cooling to 90° C. or below. On reheating the bar to 100° C., it regained its original shape. With continued heating at 100° C. the bar became no longer bendable at that temperature.

*Example 10*

A viscous blend was made by warming to a temperature of 60° C., 45 parts of 4,4'dihydroxydiphenyldimethylmethane and 100 parts of the same lot of diglycidyl ether resin as was used in Example 9, equivalent to a ratio of 0.81 mol of diphenol per mol of diglycidyl ether. To this viscous blend was added 1.1 parts of tri(dimethylaminomethyl) phenol as catalyst, 0.75 per cent by weight of the blend.

The blend was warmed, poured into a mold and hardened to the infusible or thermoset state by heating it in an oven maintained at a temperature of 90° C. for a period of twenty hours. The hardened resin was clear, tough and acetone insoluble.

*Example 11*

A clear, viscous blend was made by warming to a temperature of 80° C., eight parts (0.04 mol) of 4,4'dihydroxydiphenylmethane and 16.7 parts (0.05 mol) of the diglycidyl ether of 4,4'dihydroxydiphenylmethane and having an epoxy content which was 93.5 per cent of theoretical. These amounts correspond to a ratio of 0.8 mol of the diphenol per mol of the diglycidyl ether. With 0.2 per cent by weight of potassium hydroxide as catalyst, this blend was hardened in nine minutes by heating it in an oven at a temperature of 160° C. to a strong, tough, clear, infusible thermoset resin.

*Example 12*

A highly viscous blend similar to that of Example 11 was made by substituting 8.57 parts (0.04 mol) of 4,4'-dihydroxydiphenylmethylmethane $CH_3CH(C_6H_4OH)_2$ as the diphenol of the blend, maintaining the same ratio of 0.8 mol of diphenol per mol of diglycidyl ether. The blend hardened to the solid infusible gel state in six minutes at an oven temperature of 160° C. using 0.2 per cent of potassium hydroxide as catalyst. The hardened blend was an excellent, tough, clear thermoset resin of high tensile strength.

*Example 13*

A blend similar to those of Examples 11 and 12 was made by substituting 9.7 parts (0.04 mol) of 4,4'dihydroxydiphenyl normal propyl methane, $C_3H_7CH(C_6H_4OH)_2$, as the diphenol of the blend, maintaining the same ratio of 0.8 mol of diphenol per mol of diglycidyl ether. With 0.2 per cent of potassium hydroxide as catalyst, the blend hardened in ten minutes to an infusible, solid state at an oven temperature of 160° C. to yield a tough, strong, clear thermoset resin.

*Example 14*

(a) A clear, viscous blend was made by warming together at a temperature of 80° C., 16 parts (0.08 mol) of 4,4'dihydroxydiphenylmethane and 39.2 parts (0.099 mol) of the diglycidyl ether of 4,4'dihydroxydiphenyldimethylmethane, having an epoxy content which was 85.8 per cent of theoretical. These amounts corresponded to a ratio of 0.8 mol of the diphenol per mol of the diether. With 0.75 per cent, by weight, of potassium hydroxide as catalyst, the blend was hardened to a strong, tough, clear, infusible thermoset resin in 100 seconds on a hot plate maintained at a temperature of 160° C.

(b) A similar blend differing only in the substitution of 2,4'dihydroxydiphenylmethane as the diphenol in the blend, likewise yielded a clear, strong, tough, infusible thermoset resin by heating the blend on a hot plate at the same temperature. A slightly longer hardening time of about 125 seconds was required, however.

(c) Another similar blend was made substituting a like amount of 2,2'dihydroxydiphenylmethane as the diphenol. Here, also, the rate of hardening on a hot plate of 150 seconds was not as rapid as with the 4,4'isomer and was but slightly slower than with the 2,4'isomer diphenol. The thermoset resin was comparable in quality, however, with those made using the 4,4' and 2,4'dihydroxy isomers as the diphenol of the blend.

*Example 15*

(a) A mechanical blend was made by mixing one part (0.005 mol) of the 2,2'dihydroxydiphenylmethane and 1.87 parts (0.006 mol) of the diglycidyl ether of 2,2'dihydroxydiphenylmethane. Pure crystals of the diglycidyl ether had a melting point of 83° to 85° C. These amounts corresponded to a ratio of 0.83 mol of the diphenol per mol of the diglycidyl ether. This mechanical mixture melted to a clear liquid on warming to a temperature of about 80° to 85° C. and at a temperature of 160° C. thermoset in 280 seconds to a clear, strong, tough, infusible resin using 0.2 per cent of potassium hydroxide, by weight, as catalyst.

(b) In a similar run, a clear, viscous blend was prepared by warming to 90° C., a mixture containing 0.41 mol of the diphenol per mol of the diglycidyl ether. This blend thermoset to the infusible state in about 120 seconds on a hot plate maintained at a temperature of 160° C., using 0.6 per cent, by weight, of potassium hydroxide as catalyst, after having remained as a meltable resin for several hours in the presence of the catalyst and at a temperature of 90° C. The thermoset resin was light-colored and tough and was insoluble in alcohol, acetone, benzene and other commonly-used solvents.

(c) In another similar run in which 1.18 parts (0.005 mol) of 4,4'dihydroxydiphenyldimethylmethane was substituted as the diphenol of the blend, using 1.3 parts of the diglycidyl ether and maintaining the ratio of 0.8 mol per mol of the diglycidyl ether of 2,2'dihydroxydiphenylmethane, a clear, infusible, tough resin was obtained with a somewhat longer hardening time on a hot plate maintained at a temperature of 160° C., using about 0.2 per cent, by weight, of potassium hydroxide catalyst.

*Example 16*

A blend was made by mechanically mixing 15.0 parts (0.075 mol) of crystalline 2,4'dihydroxydiphenylmethane and 28.1 parts (0.009 mol) of the pure, crystalline diglycidyl ether of 2,4'dihydroxydiphenylmethane. The pure crystals of the diether had a melting point of 59.5° to 60.5° C. The amounts employed corresponded to a ratio of 0.83 mol of diphenol per mol of diglycidyl ether. This blend melted and then thermoset to a tough, clear, infusible resin in 200 seconds on a hot plate maintained at a temperature of 160° C., using 0.2 per cent of potassium hydroxide as catalyst.

*Example 17*

A clear, viscous blend was made by warming to 60° C. a mixture of 15.7 parts (0.079 mol) of dihydroxydiphenylmethane and 50.0 parts (0.1 mol) of the diglycidyl ether of dihydroxydiphenylmethane of 62.9 per cent epoxy content corresponding to a ratio of 0.8 mol of diphenol per mol of diglycidyl ether. The diphenol was a mixture of the 2,2', the 2,4' and the 4,4' isomers, as made from phenol and formaldehyde. The diglycidyl ether was also a mixture of the 2,2', the 2,4' and the 4,4' isomers obtained by reacting epichlorhydrin with the diphenol, as made from phenol and formaldehyde, using the required amount of alkali. At a temperature of 160° C., the blend thermoset to an infusible resin which was clear and tough, using about 0.2 per cent of potassium hydroxide as catalyst.

*Example 18*

A viscous, homogeneous blend was made by stirring at a temperature of about 30° C., a mixture of 8.0 parts (0.04 mol) of 4,4'dihydroxydiphenylmethane and 17.4 parts (0.05 mol) of the diglycidyl ether of 4,4'dihydroxydiphenylmethane having an epoxy content of 93.8 per cent of theory, corresponding to a ratio of 0.8 mol of the diphenol per mol of the diglycidyl ether. At a hardening temperature of 160° C., this viscous blend thermoset in four minutes into an infusible, resinous mass, using 0.5 per cent of potassium hydroxide as catalyst. An excellent, tough, infusible resin was obtained.

*Example 19*

A liquid blend was made by warming 4.3 parts (0.02 mol) of 4,4'dihydroxydiphenylmethylmethane, $CH_3CH(C_6H_4OH)_2$, and 8.7 parts (0.025 mol) of the diglycidyl ether of 4,4'dihydroxydiphenylmethylmethane having an epoxy content of 93.8 per cent of theoretical, corresponding to a ratio of 0.8 mol of the diphenol per mol of the diglycidyl ether. Using 0.5 per cent of potassium hydroxide as catalyst, the blend thermoset in four minutes at a temperature of 160° C. The thermoset resin was a clear, tough, infusible resin of good quality.

*Example 20*

A run was made similar to that of Example 19, except that 3.0 parts (0.0124 mol) of 4,4'dihydroxydiphenyl normal propylmethane were substituted as the diphenol, while using 5.4 parts (0.0155 mol) of the same diglycidyl ether as in Example 19 to maintain the same ratio of 0.8 mol of diphenol per mol of diglycidyl ether in the blend. On heating the composition to thermoset it, there was obtained a clear, tough, flexible, infusible resin of good quality. With 0.5 per cent of potassium hydroxide as catalyst, the time required for the blend to thermoset at a temperature of 160° C. was five minutes.

*Example 21*

A blend was made of 43 parts (0.16 mol) of 4,4'diphenylolcyclohexane, $C_6H_{10}(C_6H_4OH)_2$, and 100.0 parts (0.26 mol) of the diglycidyl ether of 4,4'diphenylolcyclohexane, corresponding to a ratio of 0.8 mol of the diphenol per mol of the diglycidyl ether. Using 0.8 per cent of potassium hydroxide as catalyst, the blend thermoset in 320 seconds at a temperature of 160° C. to yield a clear, tough, infusible resin, having a tensile strength of about 9080 p. s. i. The resin also had a strain release temperature of about 125° C. A specimen heated above 125° C. could be bent, and on cooling to 120° C. it remained in its bent position. On reheating to 125° C., however, it gradually resumed its original shape.

*Example 22*

A blend was made of 23.5 parts (0.078 mol) of di-beta naphthylol methane and 40.8 parts (0.12 mol) of the diglycidyl ether of 4,4'dihydroxydiphenyldimethylmethane, corresponding to a ratio of 0.6 mol of the diphenol per mol of the diglycidyl ether. Using 0.9 per cent of potassium hydroxide as catalyst, the hardening time of the blend was about four minutes at a temperature of 160° C. The resultant thermoset resin was a clear, tough, insoluble, infusible resin.

*Example 23*

A blend was made of 2.82 parts (0.008 mol) of 4,4'diphenyloldiphenylmethane,

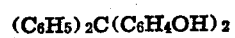

and 3.40 parts (0.010 mol) of the pure diglycidyl ether of 4,4'diphenyloldimethylmethane, corresponding to a ratio of 0.8 mol of diphenol per mol of the diglycidyl ether. Using 0.5 per cent of potassium hydroxide as catalyst, the blend

Example 24

A run was made similar to that of Example 23, except that 5.1 parts (0.02 mol) of 4,4'dihydroxy-3,3'dimethyldiphenyldimethylmethane (CH₃)₂C(CH₃C₆H₃OH)₂ was substituted as the diphenol of the blend with 9.8 parts of the diglycidyl ether corresponding to the same ratio of 0.8 mol of diphenol per mol of the diglycidyl ether. Using 0.7 per cent of potassium hydroxide, the blend required a period of 2 minutes, 33 seconds to thermoset on heating on a hot plate at a temperature of 160° C. The thermoset blend was an infusible, tough, flexible, clear resin.

Example 25

Another run was made, similar to those of Examples 23 and 24, except that 5.1 parts (0.02 mol) of 4,4'dihydroxy-2,2', 6,6'tetratertiarybutyldiphenylmethane was substituted as the diphenol of the blend, while maintaining the same ratio of 0.8 mol of diphenol per mol of the diglycidyl ether. On heating the blend on a hot plate maintained at a temperature of 160° C., using 0.5 per cent of potassium hydroxide as catalyst, it thermoset to yield a clear, tough, infusible, insoluble resin.

Example 26

A run was made similar to that of Example 25, except that 8.5 parts (0.025 mol) of the diglycidyl ether of 4,4'dihydroxy-3,3', 5,5'tetratertiarybutyldiphenylmethane was substituted as the diglycidyl ether of the blend, while maintaining the same ratio of 0.8 mol of the diphenol per mol of the diglycidyl ether. The blend was thermoset to a clear, tough, infusible, insoluble resin on heating at a temperature of 160° C., using 0.5 part of potassium hydroxide as catalyst.

Example 27

A blend was made of 21.2 parts (0.088 mol) of 4,4'dihydroxydiphenylnormalpropylmethane, C₃H₇CH(C₆H₄OH)₂, and 100 parts (0.225 mol) of the diglycidyl ether of 4,4'dihydroxydiphenyldimethylmethane containing epoxy groups amounting to 86.8 per cent of theory, corresponding to a ratio of 0.343 mol of the diphenol per mol of the diether. With 0.45 per cent of potassium hydroxide as catalyst, the blend was heated in an oven at a temperature of 160° C. It thermoset in four minutes to a clear, tough, infusible resin having a tensile strength of 8940 p. s. i.

In a similar run in which 49.5 parts (0.204 mol) of the same diphenol was used to provide a diphenol-diether ratio of 0.8, the blend required six minutes to thermoset on heating it in an oven at a temperature of 160° C. in the presence of 0.4 per cent of potassium hydroxide as catalyst. This thermoset resin was also clear, tough and infusible and had a tensile strength of 9080 p. s. i, and a strain release temperature of 90° C.

Example 28

A homogeneous blend was made by warming at a temperature of 90° C., a mixture of 17.9 parts (0.074 mol) of 4,4'dihydroxydiphenylmethylethylmethane, (CH₃)(C₂H₅)C(C₆H₄OH)₂, and 70 parts (0.185 mol) of the diglycidyl ether of 4,4'dihydroxydiphenylmethylethylmethane, having an epoxy content of 93.5 per cent of theory, corresponding to a ratio of 0.4 mol of the diphenol per mol of the diglycidyl ether. A fusible, grindable, thermosetting blend was obtained by continuing the heating for about two hours at that same temperature. With 0.4 per cent of potassium hydroxide as catalyst, the ground, fusible, thermosetting blend was thermoset in five minutes at a temperature of 160° C. The resulting thermoset resin was a clear, tough, infusible resin having a tensile strength of 10,350 p. s. i.

In a similar run 37.5 parts (0.148 mol) of the same diphenol was warmed for a period of two hours at 90° C. with an amount of diphenol such as to give a diphenol-diether mol ratio of 0.8. The time required to thermoset the blend in the form of castings in open-top molds was 4.5 minutes at a temperature of 160° C., using 0.5 per cent of potassium hydroxide as the catalyst. The thermoset blend was a clear, tough, infusible resin having a tensile strength of 10,125 p. s. i, and a strain release temperature of 105° C.

Example 29

A homogeneous blend was made by mixing and warming 20.2 parts (0.0945 mol) of 4,4'dihydroxydiphenylmethylmethane, CH₃CH(C₆H₄OH)₂, and 100 parts (0.255 mol) of the diglycidyl ether of 4,4'dihydroxydiphenyldimethylmethane, corresponding to a diphenol-diglycidyl ether mol ratio of 0.374. On heating on a hot plate at a temperature of 160° C. the composition thermoset to an infusible resinous mass in 3.5 minutes in the presence of 0.45 per cent of potassium hydroxide as catalyst. Thermoset castings made in a mold and thereafter heated for twenty-four hours gave a clear, tough, infusible resin which had a tensile strength of 9700 p. s. i.

In a similar run in which 39.7 parts (0.185 mol) of the same diphenol was used in the blend with an amount of diglycidyl ether so as to give a diphenol-diglycidyl ether mol ratio of 0.73, the time required to thermoset the blend to the solid infusible state was six minutes on heating it on a hot plate at a temperature of 160° C., and in the presence of 0.4 per cent of potassium hydroxide as catalyst. The thermoset blend was a clear, tough, infusible resin having a tensile strength of 9935 p. s. i, and a strain release temperature of 100° C.

Example 30

A homogeneous blend was made by mixing and warming 20.4 parts (0.102 mol) of 4,4'dihydroxydiphenylmethane, CH₂(C₆H₄OH)₂, and 100 parts (0.225 mol) of the diglycidyl ether of 4,4'dihydroxydiphenyldimethylmethane, having an epoxy content of 87.3 per cent of the theoretical and corresponding to a diphenol-diglycidyl ether mol ratio of 0.4. On heating the blend on a hot plate in the presence of 0.45 per cent of potassium hydroxide as catalyst, and at a temperature of 160° C., a time of 3.6 minutes was required to thermoset the composition to the infusible state. The thermoset resin was a clear, tough, infusible resin having a tensile strength of 8735 p. s. i.

In a similar run in which 40.8 parts (0.204 mol) of the same diphenol was used in the blend for a diphenol-diglycidyl ether mol ratio of 0.8, the time required to thermoset the composition to infusibility was 6.5 minutes at 160° C., in the presence of 0.4 per cent of potassium hydroxide as catalyst. The thermoset resin was a clear, tough, infusible resin having a tensile strength of 8975 p. s. i, and a strain release temperature of 85° C.

The thermosetting blends or compositions of the present invention are useful as plasticizers or modifiers for other resins, rubbers and fibers wherein their hardening properties may be used if desired. They may, for instance, be mixed with polyamides of the fiber-forming type, the mixture then drawn to fiber, and the drawn fiber hardened.

The soluble thermosetting compositions may be blended with solvents to make varnishes, or blended with other resins including the vinyl resins or with drying oils or tars to make coating materials, impregnants, hot melts, molding mixtures or compositions.

The thermosetting blends may be further blended with fillers before hardening, to make, for instance, a woodflour-thermosetting molding mixture; or the thermosetting composition may be partly or completely hardened without admixture of other materials and the thermoset resin used as a filler in brake-lining compositions or in phenol-formaldehyde molding mixtures.

In tensile strength, electrical resistance, resistance to decomposition at elevated temperatures, resistance to shock by impact, the thermoset resins are superior to conventional phenol-formaldehyde resins, and may replace them in any of their uses, including molded structures, laminated structures, for sheets to be punched into washers, coating materials resistant to attack by solvents and many others.

The thermosetting compositions are useful also in the bonding of glass; of abrasive grains, as in abrasive paper; of asbestos as in brake lining; and of sand, as in mold cores. Blended with rubber they may be used in the bonding of metal surfaces, and they may be used for making cements. Because of the resistance to attack by caustic, the compositions, particularly when amine catalysts are present to cause rapid hardening at room temperature may be used in liners for tank cars for transporting caustic.

The thermosetting compositions may be extruded as filaments, or drawn to partly aligned fibers, which are susceptible to further processing.

By the term p. s. i., as used herein is meant pounds per square inch. By the terms ratio and mol ratio as used herein with respect to the amounts of diphenol and diglycidyl ether in the blend, is meant the ratio of the mols of diphenol per mol of diglycidyl ether.

What is claimed is:

1. A thermosetting composition comprising a diphenol of the general formula

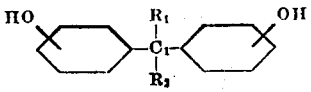

and a diglycidyl ether of a diphenol of the general formula

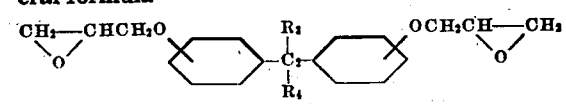

in which $R_1$ and $R_2$, when taken collectively with the connector carbon atom $C_1$, and $R_3$ and $R_4$, when taken collectively with the connector carbon atom $C_2$, are from the group consisting of cyclohexyl and alkyl-substituted cyclohexyl, and when taken separately, are from the group consisting of hydrogen, alkyl, cyclohexyl, phenyl and alkyl-substituted cyclohexyl and phenyl groups with the total number of carbon atoms in the group or groups attached to each of said connector carbon atoms not exceeding twelve, and the number of carbon atoms in any of said alkyl groups not exceeding six, said diphenol and said diglycidyl ether being present in said composition in amounts corresponding to a ratio of about 0.2 to 1.0 mol of diphenol per mol of diglycidyl ether.

2. A thermosetting composition comprising a diphenol of the general formula

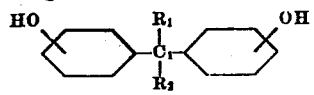

and a diglycidyl ether of a diphenol of the general formula

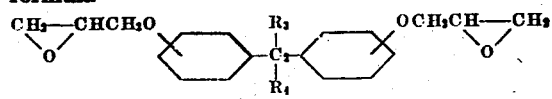

in which $R_1$ and $R_2$, when taken collectively with the connector carbon atom $C_1$, and $R_3$ and $R_4$, when taken collectively with the connector carbon atom $C_2$, are from the group consisting of cyclohexyl and alkyl-substituted cyclohexyl, and when taken separately, are from the group consisting of hydrogen, alkyl, cyclohexyl, phenyl and alkyl-substituted cyclohexyl and phenyl groups with the total number of carbon atoms in the group or groups attached to each of said connector carbon atoms not exceeding twelve, and the number of carbon atoms in any of said alkyl groups not exceeding six, said diphenol and said diglycidyl ether being present in said composition in amounts corresponding to a ratio of about 0.4 to 0.95 mol of diphenol per mol of diglycidyl ether.

3. A thermosetting composition comprising a diphenol of the general formula

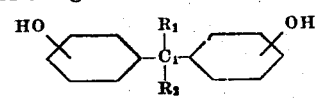

and a diglycidyl ether of a diphenol of the general formula

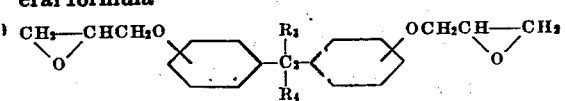

in which $R_1$ and $R_2$, when taken collectively with the connector carbon atom $C_1$, and $R_3$ and $R_4$, when taken collectively with the connector carbon atom $C_2$, are from the group consisting of cyclohexyl and alkyl-substituted cyclohexyl, and when taken separately, are from the group consisting of hydrogen, alkyl, cyclohexyl, phenyl and alkyl-substituted cyclohexyl and phenyl groups with the total number of carbon atoms in the group or groups attached to each of said connector carbon atoms not exceeding twelve, and the number of carbon atoms in any of said alkyl groups not exceeding six, said diphenol and said diglycidyl ether being present in said composition in amounts corresponding to a ratio of about 0.8 mol of diphenol per mol of diglycidyl ether.

4. A thermosetting composition comprising a dihydroxydiphenyl methane free of substituents other than lower alkyl groups, fluorine and chlorine and the diglycidyl ether of 4,4'-dihydroxydiphenyl dimethylmethane blended in the ratio of about 0.2 to 1.0 mol of the diphenol per mol of the diglycidyl ether.

5. A thermosetting composition comprising 4,4'-dihydroxydiphenyl dimethylmethane and the diglycidyl ether of 4,4'-dihydroxydiphenyl dimethylmethane blended in the ratio of about 0.2 to 1.0 mol of the diphenol per mol of the diglycidyl ether.

6. A thermosetting composition comprising 4,4'-dihydroxydiphenyl dimethylmethane and the diglycidyl ether of 4,4'-dihydroxydiphenyl dimethylmethane blended in the ratio of about 0.4 to 0.95 mol of the diphenol per mol of the diglycidylether.

7. A thermosetting composition comprising 4,4'-dihydroxydiphenyl dimethylmethane and the diglycidyl ether of 4,4'-dihydroxydiphenyl dimethylmethane blended in the ratio of about 0.8 mol of the diphenol per mol of the diglycidylether.

8. A thermosetting composition comprising a dihydroxydiphenyl methane free of substituents other than lower alkyl groups, fluorine and chlorine and the diglycidyl ether of 4,4'-dihydroxydiphenyl methylethyl methane blended in the ratio of about 0.2 to 1.0 mol of the diphenol per mol of the diglycidylether.

9. A thermosetting composition comprising a 4,4'-dihydroxydiphenyl methane free of substituents other than lower alkyl groups, fluorine and chlorine and the diglycidyl ether of 4,4'-dihydroxydiphenyl methylethylmethane blended in the ratio of about 0.4 to 0.95 mol of such diphenol per mol of the diglycidylether.

10. A thermosetting composition comprising a 4,4'-dihydroxydiphenyl methane free of substituents other than lower alkyl groups, fluorine and chlorine and the diglycidyl ether of 4,4'-dihydroxydiphenyl methylethylmethane blended in the ratio of about 0.8 mol of such diphenol per mol of the diglycidylether.

11. A thermosetting composition comprising a dihydroxydiphenyl methane free of substituents other than lower alkyl groups, fluorine and chlorine and the diglycidyl ether of 4,4'-dihydroxydiphenyl methylphenylmethane blended in the ratio of about 0.2 to 1.0 mol of the diphenol per mol of the diglycidylether.

12. A thermosetting composition comprising 4,4' - dihydroxydiphenyl methylphenylmethane and the diglycidyl ether of 4,4'-dihydroxydiphenyl methylphenylmethane blended in the ratio of about 0.2 to 1.0 mol of the diphenol per mol of the diglycidylether.

13. A thermosetting composition comprising 4,4' - dihydroxydiphenyl methylphenylmethane and the diglycidyl ether of 4,4'-dihydroxydiphenyl methylphenylmethane blended in the ratio of about 0.4 to 0.95 mol of the diphenol per mol of the diglycidylether.

14. A thermosetting composition comprising 4,4' - dihydroxydiphenyl methylphenylmethane and the diglycidyl ether of 4,4'-dihydroxydiphenyl methylphenylmethane blended in the ratio of about 0.8 mol of the diphenol per mol of the diglycidylether.

15. A tough, infusible thermoset resin which is a reaction product of a diphenol of the general formula

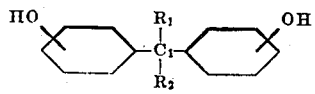

and a diglycidyl ether of a diphenol of the general formula

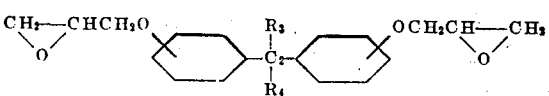

in which $R_1$ and $R_2$, when taken collectively with the connector carbon atom $C_1$, and $R_3$ and $R_4$, when taken collectively with the connector carbon atom $C_2$, are from the group consisting of cyclohexyl and alkyl-substituted cyclohexyl, and when taken separately, are from the group consisting of hydrogen, alkyl, cyclohexyl, phenyl and alkyl-substituted cyclohexyl and phenyl groups with the total number of carbon atoms in the group or groups attached to each of said connector carbon atoms not exceeding twelve, and the number of carbon atoms in any of said alkyl groups not exceeding six, said diphenol and said diglycidyl ether being combined therein in amounts corresponding to a ratio of about 0.2 to 1.0 mol of diphenol per mol of the diglycidylether.

16. In a process for making tough, infusible thermoset resin the step which includes heating and at least partially reacting a diphenol and a diglycidyl ether of a diphenol in a ratio of about 0.2 to 1.0 mol of diphenol per mol of the diglycidyl ether, said diphenol being of the general formula

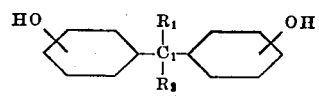

and said diglycidyl ether being of the general formula

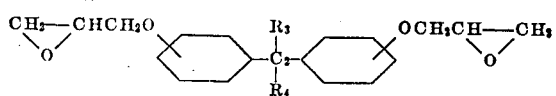

in which $R_1$ and $R_2$, when taken collectively with the connector carbon atom $C_1$, and $R_3$ and $R_4$, when taken collectively with the connector carbon atom $C_2$, are of the group consisting of cyclohexyl and alkyl-substituted cyclohexyl groups, and, when taken separately are of the group consisting of hydrogen, alkyl, cyclohexyl, phenyl, and alkyl-substituted cyclohexyl and phenyl groups, with the total number of carbon atoms in the group or groups attached to each of the connector carbon atoms not exceeding twelve, and the number of carbon atoms in any of said alkyl groups not exceeding six.

17. In a process for making a tough, infusible thermoset resin the step which includes heating and at least partially reacting a diphenol and a diglycidyl ether of a diphenol in a ratio of about 0.4 to 0.95 mol of diphenol per mol of the diglycidyl ether, said diphenol being of the general formula

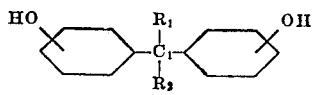

and said diglycidyl ether being of the general formula

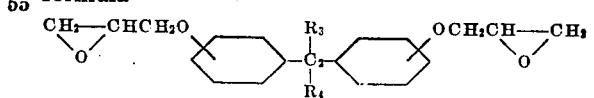

in which $R_1$ and $R_2$, when taken collectively with the connector carbon atom $C_1$, and $R_3$ and $R_4$, when taken collectively with the connector carbon atom $C_2$, are of the group consisting of cyclohexyl and alkyl-substituted cyclohexyl groups, and when taken separately are of the group consisting of hydrogen, alkyl, cyclohexyl, phenyl, and alkyl-substituted cyclohexyl and phenyl groups, with the total number of carbon atoms in the group or groups attached to each of the connector carbon atoms not exceeding twelve, and the number of carbon atoms in any of said alkyl groups not exceeding six.

18. In a process for making a tough, infusible thermoset resin the step which includes heating and at least partially reacting a diphenol and a diglycidyl ether of a diphenol in a ratio of about 0.8 mol of diphenol per mol of the diglycidyl ether, said diphenol being of the general formula

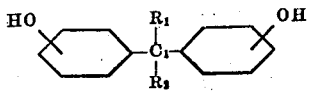

and said diglycidyl ether being of the general formula

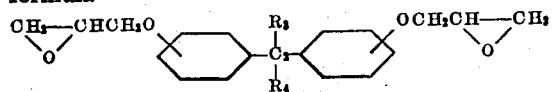

in which $R_1$ and $R_2$, when taken collectively with the connector carbon atom $C_1$, and $R_3$ and $R_4$, when taken collectively with the connector carbon atom $C_2$, are of the group consisting of cyclohexyl and alkyl-substituted cyclohexyl groups, and when taken separately are of the group consisting of hydrogen, alkyl, cyclohexyl, phenyl, and alkyl-substituted cyclohexyl and phenyl groups, with the total number of carbon atoms in the group or groups attached to each of the connector carbon atoms not exceeding twelve, and the number of carbon atoms in any of said alkyl group not exceeding six.

19. In a process for making a tough, infusible resin the step which includes heating and at least partially reacting a dihydroxydiphenyl methane free of substituents other than lower alkyl groups, fluorine and chlorine and the diglycidyl ether of 4,4'-dihydroxydiphenyl dimethyl methane in the ratio of about 0.2 to 1.0 mol of the diphenol per mol of the diglycidyl ether.

20. In a process for making a tough, infusible resin the step which includes heating and at least partially reacting a dihydroxydiphenyl methane free of substituents other than lower alkyl groups, fluorine and chlorine and the diglycidyl ether of 4,4'-dihydroxydiphenyl methylethyl methane in the ratio of about 0.2 to 1.0 mol of the diphenol per mol of the diglycidyl ether.

21. In a process for making a tough, infusible resin the step which includes heating and at least partially reacting a dihydroxydiphenyl methane free of substituents other than lower alkyl groups, fluorine and chlorine and the diglycidyl ether of 4,4'-dihydroxyphenyl methylphenyl methane in the ratio of about 0.2 to 1.0 mol of the diphenol per mol of the diglycidyl ether.

22. In a process for making a tough, infusible thermoset resin from a diphenol of the general formula

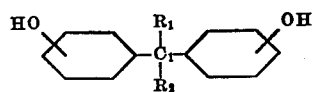

and a diglycidyl ether of a diphenol of the general formula

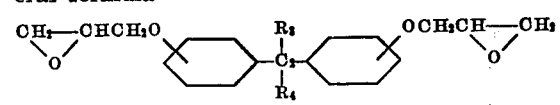

in which $R_1$ and $R_2$, when taken collectively with the connector carbon atom $C_1$, and $R_3$ and $R_4$, when taken collectively with the connector carbon atom $C_2$, are from the group consisting of cyclohexyl and alkyl-substituted cyclohexyl, and when taken separately, are from the group consisting of hydrogen, alkyl, cyclohexyl, phenyl, and alkyl-substituted cyclohexyl and phenyl groups with the total number of carbon atoms in the group or groups attached to each of said connector carbon atoms not exceeding twelve and the number of carbon atoms in any of said alkyl groups not exceeding six, the steps which include initially reacting said diphenol and said diglycidyl ether in a ratio of not more than one mol of the diglycidyl ether per mol of diphenol to form a fusible non-thermosetting resin and thereafter adding to said fusible resin an amount of a diglycidyl ether of said general formula sufficient to bring the total amount thereof to correspond to a ratio of about 0.2 to 1.0 mol of diphenol per mol of diglycidyl ether to form a thermosetting composition.

23. In a process for making a tough, infusible thermoset resin from a diphenol of the general formula

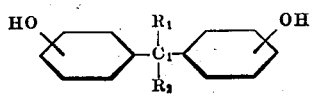

and a diglycidyl ether of a diphenol of the general formula

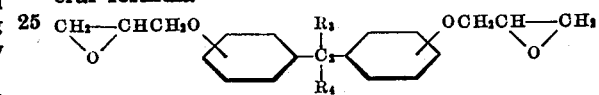

in which $R_1$ and $R_2$, when taken collectively with the connector carbon atom $C_1$, and $R_3$ and $R_4$, when taken collectively with the connector carbon atom $C_2$, are from the group consisting of cyclohexyl and alkyl-substituted cyclohexyl, and when taken separately, are from the group consisting of hydrogen, alkyl, cyclohexyl, phenyl, and alkyl-substituted cyclohexyl and phenyl groups with the total number of carbon atoms in the group or groups attached to each of said connector carbon atoms not exceeding twelve and the number of carbon atoms in any of said alkyl groups not exceeding six, the steps which include initially reacting said diphenol and said diglycidyl ether in a ratio of not more than one mol of the diglycidyl ether per mol of diphenol to form a fusible non-thermosetting resin and thereafter adding to said fusible resin an amount of a diglycidyl ether of said general formula sufficient to bring the total amount thereof to correspond to a ratio of about 0.4 to 0.95 mol of diphenol per mol of diglycidyl ether to form a thermosetting composition.

24. In a process for making a tough, infusible thermoset resin from a diphenol of the general formula

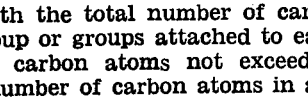

and a diglycidyl ether of a diphenol of the general formula

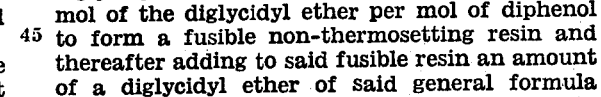

in which $R_1$ and $R_2$, when taken collectively with the connector carbon atom $C_1$, and $R_3$ and $R_4$, when taken collectively with the connector carbon atom $C_2$, are from the group consisting of cyclohexyl and alkyl-substituted cyclohexyl, and when taken separately, are from the group consisting of hydrogen, alkyl, cyclohexyl, phenyl, and alkyl-substituted cyclohexyl and phenyl groups with the total number of carbon atoms in the group or groups attached to each of said

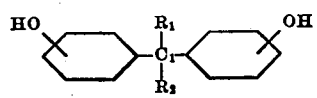
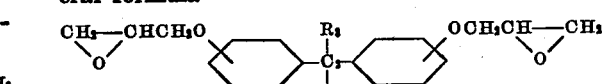
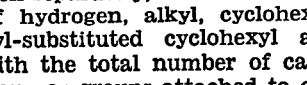

connector carbon atoms not exceeding twelve and the number of carbon atoms in any of said alkyl groups not exceeding six, the steps which include initially reacting said diphenol and said diglycidyl ether in a ratio of not more than one mol of the diglycidyl ether per mol of diphenol to form a fusible non-thermosetting resin and thereafter adding to said fusible resin an amount of a diglycidyl ether of said general formula sufficient to bring the total amount thereof to correspond to a ratio of about 0.8 mol of diphenol per mol of diglycidyl ether to form a thermosetting composition.

25. In a process for making a tough, infusible thermoset resin from a dihydroxy-diphenylmethane free of substituents other than lower alkyl groups, fluorine and chlorine and the diglycidyl ether of 4,4'-dihydroxydiphenyl dimethyl methane, the steps which include initially reacting such diphenol and diglycidyl ether in a ratio of not more than one mol of the diglycidyl ether per mol of diphenol to form a fusible non-thermosetting resin and thereafter adding to said fusible resin an amount of diglycidyl ether sufficient to bring the total amount thereof to correspond to a ratio of about 0.2 to 1.0 mol of diphenol per mol of diglycidyl ether to form a thermosetting composition.

26. In a process for making a tough, infusible thermoset resin from a dihydroxy-diphenyl methane free of substituents other than lower alkyl groups, fluorine and chlorine and the diglycidyl ether of 4,4'-dihydroxydiphenyl methylethyl methane, the steps which include initially reacting such diphenol and diglycidyl ether in a ratio of not more than one mol of the diglycidyl ether per mol of diphenol to form a fusible non-thermosetting resin and thereafter adding to said fusible resin an amount of diglycidyl ether sufficient to bring the total amount thereof to correspond to a ratio of about 0.2 to 1.0 mol of diphenol per mol of diglycidyl ether to form a thermosetting composition.

27. In a process for making a tough, infusible thermoset resin from a dihydroxy-diphenyl methane free of substituents other than lower alkyl groups, fluorine and chlorine and the diglycidyl ether of 4,4'-dihydroxydiphenyl methylphenyl methane, the steps which include initially reacting such diphenol and diglycidyl ether in a ratio of not more than one mol of the diglycidyl ether per mol of diphenol to form a fusible non-thermosetting resin and thereafter adding to said fusible resin an amount of diglycidyl ether sufficient to bring the total amount thereof to correspond to a ratio of about 0.2 to 1.0 mol of diphenol per mol of diglycidyl ether to form a thermosetting composition.

HOWARD L. BENDER.
ALFORD G. FARNHAM.
J. WALTER GUYER.

REFERENCES CITED

The following references are of record in the file of this patent:

UNITED STATES PATENTS

| Number | Name | Date |
|---|---|---|
| 2,060,715 | Arvin | Nov. 10, 1936 |
| 2,444,333 | Castan | June 29, 1948 |